H. M. LASHER.
PROCESS OF PRODUCING HYDROCHLORIC ACID UTILIZING SLUDGE ACID.
APPLICATION FILED FEB. 12, 1919.
1,337,141.
Patented Apr. 13, 1920.
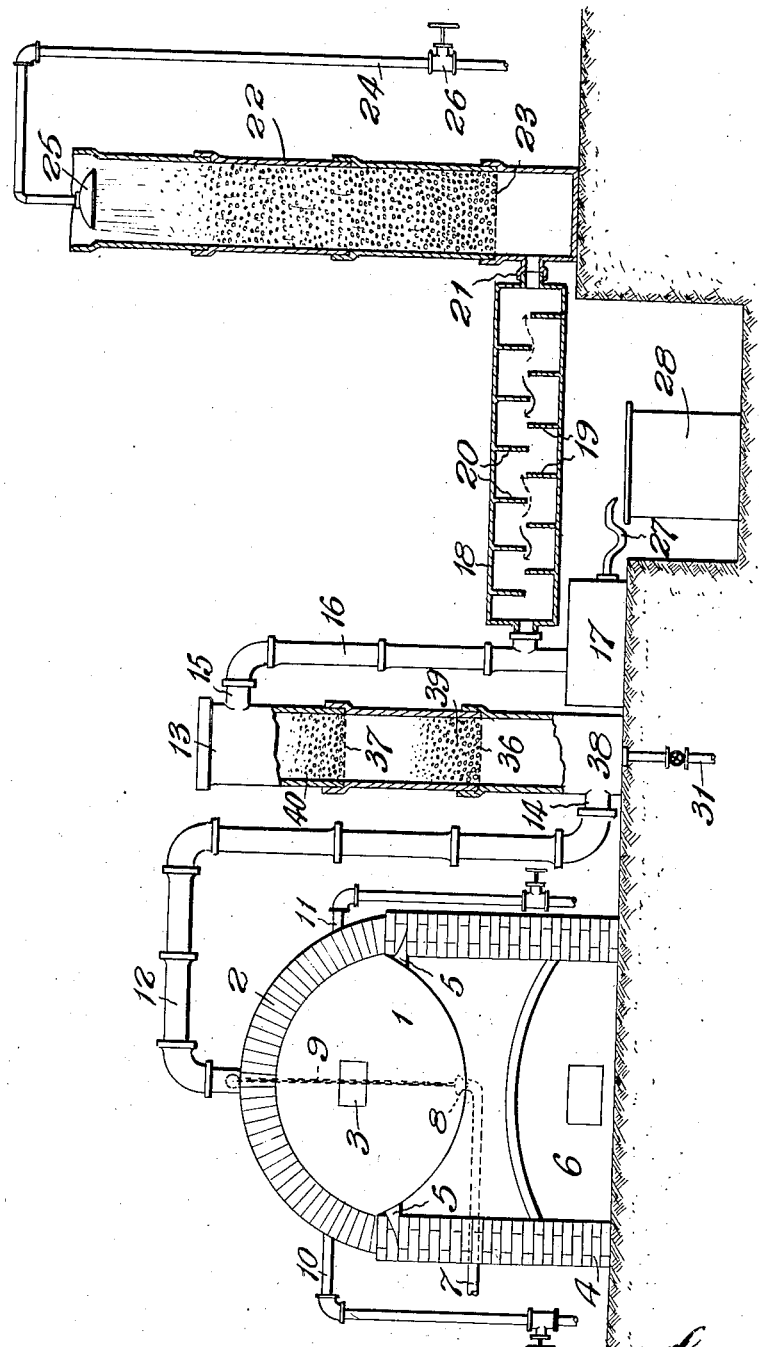

UNITED STATES PATENT OFFICE.

HENRY M. LASHER, OF KANSAS CITY, KANSAS, ASSIGNOR TO THE KANSAS CITY REFINING COMPANY, OF KANSAS CITY, KANSAS.

PROCESS OF PRODUCING HYDROCHLORIC ACID UTILIZING SLUDGE ACID.

1,337,141.   Specification of Letters Patent.   Patented Apr. 13, 1920.

Application filed February 12, 1919. Serial No. 276,611.

*To all whom it may concern:*

Be it known that I, HENRY M. LASHER, a citizen of the United States, residing at Kansas City, in the county of Wyandotte and State of Kansas, have invented certain new and useful Improvements in Processes of Producing Hydrochloric Acid Utilizing Sludge Acid, of which the following is a specification, reference being had therein to the accompanying drawing.

My invention relates to the chemical treatment of by-products and especially those resulting from the treatment of hydrocarbon oils, and has for its object the improvement of certain methods of operation heretofore employed. This application is a continuation in part of my prior application Serial No. 96,430, filed May 9, 1916, now Patent No. 1,309,206, granted July 8, 1919.

In said prior application I have illustrated and described a process for manufacturing hydrochloric acid and by-products from the waste product known as sludge acid.

Sludge acid results from the use of sulfuric acid in the treatment of hydrocarbon oils to remove asphalt, tarry matters, sulfur, and other impurities therefrom. These impurities enter into combination and form compounds with the sulfuric acid, so that the latter becomes in turn contaminated or changed to such a degree that heretofore it has been considered a mere waste product, and discarded as unfit for the manufacture of hydrochloric acid.

As described in my above mentioned prior application, I mix the sludge acid with sodium chlorid, dilute with enough water to liberate the asphalt and tarry matters, and heat this solution to a temperature not exceeding 284° C.; I then take the resulting hydrochloric acid gas through a purifying tower, containing sodium chlorid and charcoal, and finally conduct it into a receiving tank or absorber containing water in which the gas is absorbed.

In practice I have found that a more perfect absorption of the gas by the water takes place if the gas and water are run through the horizontal absorber in opposite directions, as described in this specification.

The drawing shows a diagrammatic sectional view of the apparatus employed using the improved absorbing apparatus.

Referring to the drawing, 1 represents a lead lined pan or receptacle, the top of which is closed by an acid proof tile arch 2, closed except for doors 3, used for the purpose of filling container 1. This combination forms a still, supported upon the brick walls 4 by means of ears 5 in the usual manner, said walls inclosing a furnace 6 by means of which heat may be applied to the pan or receptacle 1. At the bottom of the pan a drain pipe 7 is provided with a plug 8 controlled preferably from above as, for example, by means of a resistant rope or chain 9. This drain is used to draw off the residuum at the end of each run. Entering the still through the sides, and with ends above the pan 1, are two feed pipes 10 and 11, the first of which is used to convey water into the still, and the second to convey the sludge acid. Each of these pipes is provided with a suitable cut-off valve, and they may lead from storage tanks or other suitable sources of supply, so as to raise the efficiency of operation, and make it as nearly continuous as possible.

Leading out of the upper part of the still is the acid-proof tile pipe 12 through which the gases are conducted to the purifying tower 13. This tower is composed of acid-proof tile with inlet 14 at the bottom and outlet 15 at the top. It is divided in any suitable manner, as by means of acid resisting screens 36 and 37, into three chambers 38, 39 and 40. The chamber 38 is vacant, and is provided at the bottom with a drain pipe 31 fitted with a suitable cock. This chamber 38 catches all impurities which are precipitated back from the upper purifying chambers 39 and 40. The chamber 39 is packed with lumps of sodium chlorid and has the upper part left clear. This is necessary in order to prevent impurities which have been taken out by the medium in chamber 39 from being carried up into chamber 40 by means of capillary attraction. Chamber 40 also is preferably provided with a clear upper space, although this depends somewhat upon the arrangement of the outlet 15, the object being to prevent impurities from being carried over into the outlet pipe.

The vertical pipe 16 is connected to the outlet 15 at its upper end, and to the tank 17 and the primary absorber 18 at its lower end. The absorber 18 is fitted with baffle plates or partitions 19 and 20 extending alternately from the bottom and the top, and so related to each other that liquid flowing through the absorber will be forced to pass up and down between the baffles, and gas flowing through the same compartments will be forced down against the liquid so that the gas and liquid will be brought into intimate contact with each other. Passage 21 connects the primary absorber 18 to a secondary absorber, the absorbing tower 22, which is filled with small pieces of acid-proof earthenware, supported upon the acid-resisting screen 23. Water is introduced through the pipe 24 and spray 25 controlled by valve 26 into the top of the chamber 22 through which it trickles down over the surface of the pieces of earthenware. Upon reaching the bottom of the tower 22 the dilute acid flows through the absorber 18 which empties into tank 17. The U-trap 27 allows the liquid to overflow into storage tank 28.

The operation of this apparatus is as follows:

The sludge acid is mixed with sodium chlorid in the proportion of fifty per cent. acid to fifty per cent. sodium chlorid, and this mixture is then diluted with ten per cent. water. In making this mixture in pan 1, the pipes 10 and 11 are used to introduce the acid and water respectively and the doors 3 to introduce the sodium chlorid. Heat is then produced in the furnace 6 to raise the temperature of the mixture in the container to a point not exceeding the boiling point of sulfuric acid, that is to say 284° C. The addition of water to the mixture causes the asphaltum and tarry matters to be liberated and to rise to the surface of the solution and float as a scum thereon. As the hydrochloric acid gas forms it passes through pipe 12 into the cleansing tower 13 through inlet 14. As the gas rises in tower 13 the impurities are separated out and collect in the bottom chamber 38 to be drained off through pipe 31. The purified gas passes through outlet 15 into pipe 16 and into the absorber 18. Here it comes in contact with acidulated water from tower 22 which is flowing in the opposite direction through the absorber 18. The gas and acid solution flow in counter current among the baffle plates 19 and 20, the gas and liquid attaining their forward movements in opposite waves, so that the gas and liquid are intimately mingled with each other to the end that the soluble hydrochloric acid gas is dissolved in the already acidulated water. The solid arrows indicate the direction of the water, and the dotted arrows the gas. The gas which passes through the absorber 18 passes out through passage 21 into the vertical absorption tower 22. As it passes up this tower the gas is exposed over a very large superficial area to the fresh water from spray 25 which trickles down among the pieces of earthenware in the tower. What is left of the gas after passing the spray may escape or may be received and retained in any appropriate manner if desired.

The water from the spray 25 passes down through the earthenware into the bottom of the tower 22, absorbing the acid when it falls, and thence passes through the passageway 21 into the absorber 18, where it flows among the baffles in counter-current to the incoming gas, as already stated, until it reaches pipe 16, when it passes downward into tank 17 and thence through U-trap 27 into the hydrochlorid acid solution receiving tank 28.

It should be noted that to secure the action noted the lower edges of the upper or gas baffles must not extend more than one eighth or one quarter of an inch below the level of the upper edges of the lower or liquid baffles.

Having thus described my invention what I claim and desire to secure by Letters Patent is—

The process of producing hydrochloric acid solution, which consists in producing hydrochloric acid gas, exposing it after it leaves the source to primary absorption by a stream of water into which it is actually forced by baffling its flow, the stream of water flowing in a direction opposite to that of the gas and the gas and liquid attaining their forward movements in opposite periodic waves, then carrying what is left of the acid gas through a fresh quantity of water, said water thus partly acidulated being then in its turn introduced into baffled contact with successively arriving portions of fresh gas.

In testimony whereof I affix my signature.

HENRY M. LASHER.